United States Patent [19]
Duffin et al.

[11] Patent Number: 5,870,535
[45] Date of Patent: Feb. 9, 1999

[54] METHOD AND APPARATUS FOR BUILDING RASTERIZED LINES OF BITMAP DATA TO BE PRINTED USING A PIECEWISE-LINEAR DIRECT MEMORY ACCESS ADDRESSING MODE OF RETRIEVING BITMAP DATA LINE SEGMENTS

[75] Inventors: Darrin Lee Duffin; James Howard Ellis, Jr.; Phillip Daniel Erwin, Jr.; Cuong Manh Hoang, all of Lexington, Ky.

[73] Assignee: Lexmark International, Inc., Lexington, Ky.

[21] Appl. No.: 854,607

[22] Filed: May 12, 1997

[51] Int. Cl.$^6$ .................................................. G06H 15/00
[52] U.S. Cl. .......................................... 395/115; 395/116
[58] Field of Search ..................................... 382/232, 243, 382/305, 306; 358/404, 426, 261.4, 444; 345/520, 521, 507, 509, 515, 516, 517, 514, 202, 203; 395/101, 112, 113, 114, 115, 116, 117, 872, 873, 876

[56] References Cited

U.S. PATENT DOCUMENTS

| | | | |
|---|---|---|---|
| 4,555,802 | 11/1985 | Fedak et al. ................................. | 382/56 |
| 4,942,541 | 7/1990 | Hoel et al. ................................. | 364/519 |
| 5,129,088 | 7/1992 | Auslander et al. ...................... | 395/700 |
| 5,339,164 | 8/1994 | Lim ....................................... | 358/261.1 |
| 5,416,615 | 5/1995 | Shirota .................................... | 358/530 |
| 5,502,804 | 3/1996 | Butterfield et al. ...................... | 395/147 |
| 5,504,842 | 4/1996 | Gentile .................................... | 395/174 |
| 5,574,953 | 11/1996 | Rust et al. ............................... | 395/888 |
| 5,579,452 | 11/1996 | Ambalavanar et al. ................. | 395/115 |
| 5,585,864 | 12/1996 | Takeuchi .................................. | 348/719 |
| 5,590,286 | 12/1996 | Mehring et al. ......................... | 395/250 |

*Primary Examiner*—Arthur G. Evans
*Attorney, Agent, or Firm*—John J. McArdle; Ronald K. Aust.

[57] ABSTRACT

An improved printer is provided that receives a print job from a host computer and divides the bitmap image of a page to be printed into a series of image blocks or tiles. Each image block containing non-null data will be stored in the printer's memory system, typically placed in a non-contiguous memory location with respect to other blocks. The null image data blocks will not be stored in the printer's memory system, but instead only their locations on the physical printed page will be stored in a "block list table." Each entry in the block list table contains the beginning address of the physical RAM area that contains one of the image data blocks, and also contains other variables or attributes concerning the particular image data block, such as whether or not this block is a regular non-null data block, or a "no-op" (or "NOP") block containing null data. Null data blocks require no physical memory address to be listed in their entry on the block list table, since no physical RAM areas are needed for storing null bitmap image data. Rather than building a band buffer in contiguous memory before shipping rasterized data to the laser printhead, the present invention builds in a cache a series of rasterized line segments of bitmap data in real time and sends them to the laser printhead "on the fly," by retrieving a single rasterized line segment of data, block-by-block, as needed to complete a single entire line.

21 Claims, 4 Drawing Sheets

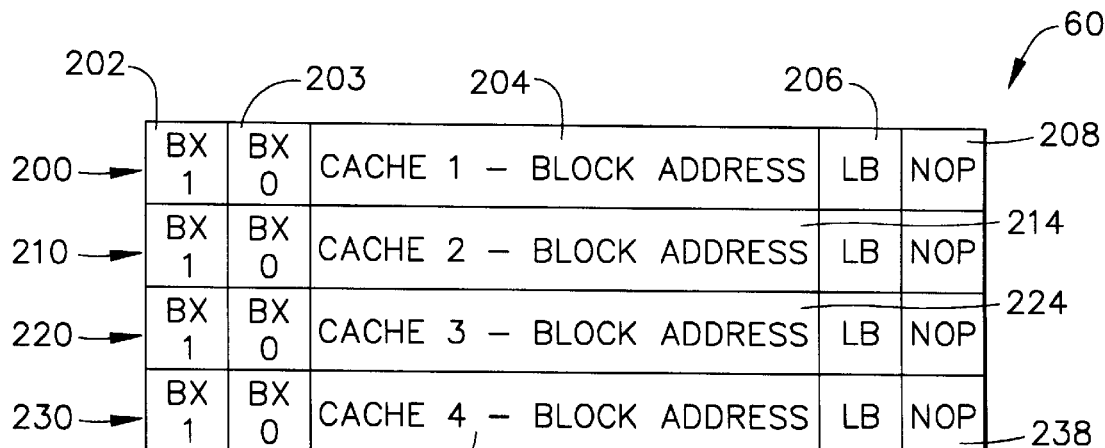
FIG. 5
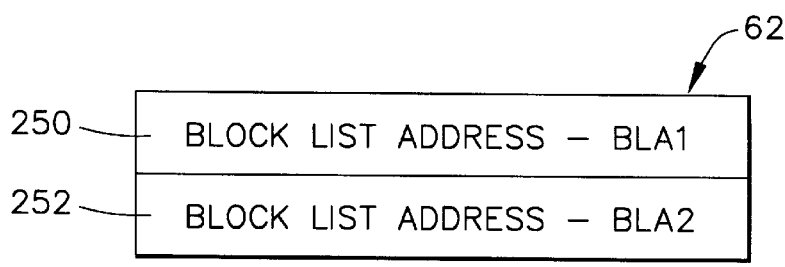
FIG. 6
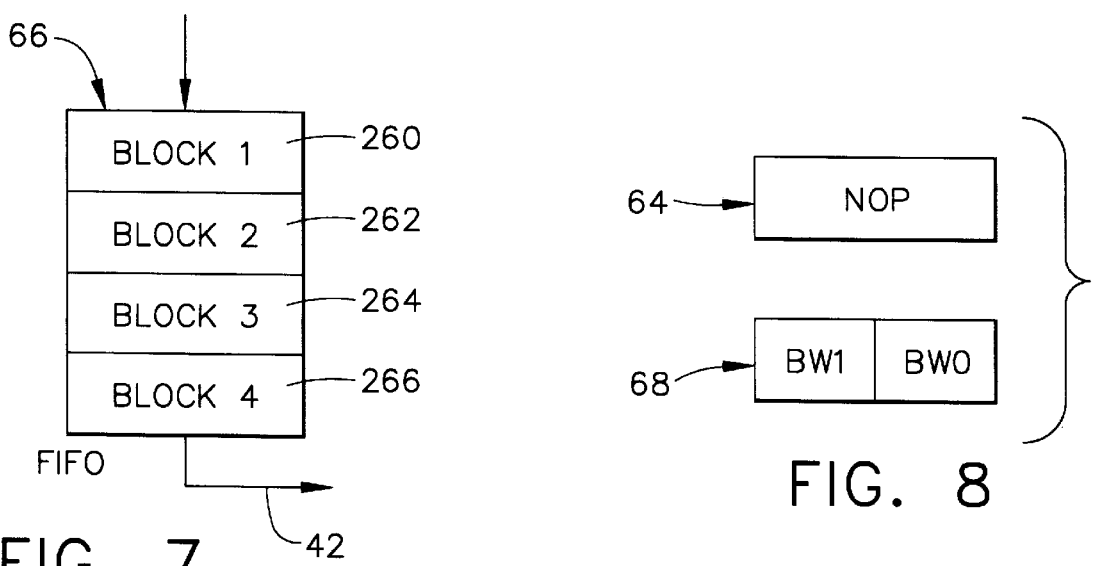
FIG. 7
FIG. 8

METHOD AND APPARATUS FOR BUILDING RASTERIZED LINES OF BITMAP DATA TO BE PRINTED USING A PIECEWISE-LINEAR DIRECT MEMORY ACCESS ADDRESSING MODE OF RETRIEVING BITMAP DATA LINE SEGMENTS

TECHNICAL FIELD

The present invention relates generally to printing equipment and is particularly directed to a laser printer of the type which prints rasterized image data a single raster line at a time. The invention is specifically disclosed as a laser printer that forms blocks or tiles of bitmap image data and temporarily stores them in noncontiguous areas of dynamic random access memory, then retrieves a single raster line from each area as needed in real time to send the data in a serialized manner to the laser print engine.

BACKGROUND OF THE INVENTION

In some conventional laser printers generally available today, the architecture of the hardware and software operating systems is such that the bitmap page image is divided up into a checkerboard pattern of units called "blocks." The number of blocks per page is dependent upon the paper size, block size, printhead resolution in dpi (dots per inch), and bitmap resolution in bits/pel. For example, an 8 ½"×11" page can be divided into rectangular blocks in which there are twenty (20) horizontal blocks × one hundred (100) vertical blocks on the page. At a printhead resolution of 1200 dpi and bitmap resolution of one bit/pel, each block would be 512 pels wide ×128 pels high.

Typically, the size of random access memory (RAM) in the printer is less than that required to store a full page bitmap. Hence, memory is allocated on a block basis when information is "painted" into each block by the rasterization process. Therefore, each block of bitmap image data is stored in a separate area from the other similar blocks, and these smaller areas will quite likely to be spread all over different memory address locations of the printer's RAM. However, when the bitmap image is to be printed, a transformation of the data stored in RAM must occur in conventional printers from a "scattered" block page representation to a "gathered" banded page representation, in which a "band" comprises a group of horizontal blocks that extend across the entire width of the printed page. This band building process copies the non-contiguous blocks into "band buffers" which each hold a page width strip in contiguous memory.

Depending upon the printer's throughput (i.e., pages per minute), multiple bands must be buffered before the image can be printed. In many printers, a specific set of memory locations is reserved in the printer's main RAM system to hold these multiple bands. A minimum of two bands is typically stored in the system's RAM: (1) the band that is presently being sent to the laser printhead as a serial data stream, and (2) another band that is currently being built so that it will be completed (and ready to print) before the previous band has finished being printed.

Some of the fundamental problems for the back end rendering software in conventional printers is that the band building process involves a copying operation of bitmap image data from the scattered blocks in non-contiguous RAM locations into the pre-allocated contiguous memory locations in RAM used to store the band buffer in real time (while the paper is moving through the printer), and thereby requiring a portion of the main processor's performance. In addition, null or "blank" blocks must be copied into the band buffer just like "real data" blocks, thereby requiring memory retrieval and storage operations that take up memory bandwidth (i.e., requiring access time to use the memory system's address and data busses). Furthermore, additional RAM locations must be allocated to hold the null block image data in the non-contiguous blocks, and additional memory must be allocated to hold the multiple band buffers.

Some of the patents which disclose image building systems for printers are as follows: U.S. Pat. No. 4,942,541 (by Hoel) discloses a patchification system that uses virtual memory for mapping image data in a printer. Physical memory is allocated as "patches" and the physical memory is used in creating a page image bitmap. A patch corresponds to a rectangular area of the page in bitmap form, and each patch is represented by non-contiguous segments of the virtual (or logical) memory, which when later mapped to the physical memory, are contiguous. When a "blank" patch is found during the step of allocation of physical memory, the blank patch is mapped to a single "blank" physical patch. All such blank patches are mapped to this same single blank physical patch. During printing, the blank physical patch is mapped back into the correct blank areas of the logical page image. This occurs during a serialization process, and if a particular mapped physical patch was found to be a zero patch, then the single blank physical patch in memory is accessed to ship the correct blank data (for the blank logical patch) to the printer. The non-blank data is mapped to physical memory addresses using logical patchified addresses, in which the physical addresses can be non-contiguous. When it is time to ship the data to the printer, the logical addresses which are contiguous use an offset (or pointer) to find the correct physical addresses to provide the proper data, as needed for the printer. This includes both blank and non-blank data as the individual patches of data are needed for the printer.

U.S. Pat. No. 5,502,804 (by Butterfield) discloses a laser printer that generates output page images in real time. Rather than requiring an entire page to be built in a bitmap form before sending it to the print engine, Butterfield discloses the use of building a single band to begin the process of printing, and after building the first band, a second band is created while the first band is being printed. By use of this method, a good deal of memory can be saved since an entire bitmap page need not be constructed before sending the data to a print engine. Even if sufficient memory is available to build a complete page, by using the banding technique of Butterfield a second page can be constructed in one band while a first page in another band is being printed. Butterfield receives high language level print job data and converts this data to "graphics orders" rather than converting directly to bitmaps. Since a single graphics command may affect more than one band, an order may be processed multiple times, using "command blocks" that are tabular structures in memory. An "order construction step" is first performed, and attempts to eliminates redundant orders by combining multiple inputs into single command blocks (thereby minimizing memory).

A first (intermediate) image drawing step proceeds in parallel with the order construction step, and draws objects in the page image. The objects are stored in the user memory for use as source data for the next (or second) drawing step. The second (deferred) image drawing step begins when all of the orders for the page image have been generated. This step may process order commands multiple times, one for each image band affected.

U.S. Pat. No. 5,574,953 (by Rust) discloses a data compression and decompression system that stores compressed data in non-contiguous memory. As the data is compressed and stored in memory, the non-contiguous segments are marked, by placing a pointer at the last location that points to the next memory used. Just prior to the pointer, a special "link" code is stored, which logically links together the non-contiguous memory. When the data is decompressed, if the code is a link code, then the address pointer directs the system to the next location in memory where the next compressed data is stored to retrieve that segment. If the code is not a link code, then the code (or data) is decompressed.

U.S. Pat. No. 5,129,088 (by Auslander) discloses a data processing system that creates virtual disks from non-contiguous groups of blocks on hard disk drives. Each drive (or drives) of physical memory locations is divided into physical partitions, each partition comprising a predetermined number of contiguous addressable blocks. The partitions in each group of blocks are not necessarily physically contiguous, although the "logical" blocks are contiguous. As the system memory requires further locations to be allocated, the system can automatically allocate one or more additional partitions, and this occurs dynamically to store further information.

U.S. Pat. No. 4,555,802 (by Fedak) discloses a system that divides image data into a plurality of segments in which each segment is either square or rectangular. The segments are analyzed to determine which contain blank or zero data or which contain at least one bit of non-zero data. The blank segments are ignored and the non-blank segments are stored and indexed. A directory is created to indicate the storage location of each group of non-blank segments as well as their spatial location with respect to the rectangular raster array of signals. All compaction and decompaction machine operations are independent of bit-significant informational content of the segments.

U.S. Pat. No. 5,416,615 (by Shirota) discloses a digital data transmitting device that extracts image data in both horizontal and vertical directions and forms an "original block" of n ×n pixel data. From this information, a transformation operation is performed, such as a two-dimensional cosine transform, thereby creating a "differential block" that consists of m ×m pixel data. The differential block data is "transform coded" to generate "coefficient data", and a "flag generation circuit" is used to transmit the coefficient data. However, this flag generation circuit generates a flag if there is an omission of the transmission of coefficient data when there is no meaningful data (generally meaning blank data), and a separate transmission circuit will transmit the flag or flags and the pixel data of blocks.

In conventional printers of the prior art, a "band" of rasterized bitmap image data must be constructed in contiguous memory before sending the band as serial data to the laser print engine. In fact, in most conventional printers, two separate bands have specific locations reserved in random access memory, one set of contiguous memory locations for the band that is now being output to the laser printhead, and a second set of contiguous memory locations for the band that is now being built. By the time the first band's data has been completely sent to the laser printhead, the second band will be entirely completed in contiguous memory, and will be available to send to the laser printhead as needed.

The amount of random access memory (RAM) reserved for the band building process is not insignificant. For example, at 1200 dpi (dots per inch) resolution, a band that covers an 8 ½" wide page, and contains 128 horizontal raster lines will require 160 Kbytes of memory. For holding two bands (or at least reserving space in memory for two such bands), the printer's memory must reserve 320 Kbytes of space.

Since many laser printers are manufactured having 2 Mbytes of RAM, this 320 KB requirement is a significant portion of the entire printer's memory. If it were possible to eliminate the memory requirements for the band building process, then a significant savings in memory space and in memory bandwidth could be realized as a significant commercial advantage, and also a performance savings for the printer.

SUMMARY OF THE INVENTION

Accordingly, it is a primary object of the present invention to provide a printing apparatus that eliminates the requirement of reserving space in memory to build the band that is about to be sent to the laser printhead.

It is another object of the present invention to provide a printing apparatus that divides a rasterized bitmap image of a page to be printed into blocks or tiles, temporarily stores the blocks containing non-null data (i.e., "real" data) into random access memory, discards the null data blocks while keeping track of their location on the imaged page, and when providing the bitmap data to the laser printhead, provides null block data from a special register, rather than from random access memory.

It is a further object of the present invention to provide a printing apparatus that divides a rasterized bitmap image of a page to be printed into blocks or tiles, temporarily stores blocks containing non-null data into random access memory, and provides a cache to hold several block list entries for easy access by the processing circuit during the serialization procedure of providing serialized bitmap data to the laser printhead.

It is yet another object of the present invention to provide a printing apparatus that divides a rasterized bitmap image of a page to be printed into blocks or tiles, temporarily stores blocks containing non-null data into random access memory, and, using a cache to hold several block list information entries, generates a "band" of bitmap data in real time to the printhead "on the fly" in which the length of the band or page width is not bounded by any preordained allocation of memory in the printer's memory system.

Additional objects, advantages and other novel features of the invention will be set forth in part in the description that follows and in part will become apparent to those skilled in the art upon examination of the following or may be learned with the practice of the invention.

To achieve the foregoing and other objects, and in accordance with one aspect of the present invention, an improved printing apparatus is provided that receives a print job from a data source (such as a host computer), interprets that data, if necessary by rasterizing it into a bitmap, and then divides the bitmap image of a page to be printed, using a software page-map (PMAP) code, into a series of image blocks or tiles. The software uses a structure called the compressed page map (CPM) for all references to bitmap block, and the CPM contains a control header which describes characteristics of the page such as resolution, paper size, etc. After the control header, the CPM contains an entry for each block on the page.

Each entry of the CPM is a pointer to the block structure, which contains a control header that describes the characteristics of the block, such as block type, size, etc. After the header, the block structure contains the real block data, which is typically 8 KB in size.

When starting a new page, the printer software references all blocks as null with no allocated memory in RAM. As the software paints black pels into the bitmap, blocks are first checked to see if they are null (all-white) or real (non-all-white). If the block to be painted into is null, the memory for the block must first be allocated (during this rendering or rasterizing procedure) before painting can proceed. If the block is real, it will have previously been allocated, and painting can proceed immediately.

Now when it comes time to print, the printer software must serialize the data so as to convert it into a format understood by the laser printhead. The software builds a "block list table" (BLT) by processing entries from the CPM. The entries in the BLT are ordered from "entry O" to "entry N" to correspond with the block order across the page. The ordering is from left to right on a simplex page and on the front side of a duplex page, and then from right to left on the back side of a duplex page.

Each image block containing non-null data will be stored in the printer's memory system, although each block will likely be placed in a non-contiguous memory location with respect to other blocks on that particular page. The null image data blocks (e.g., those image blocks containing only Logic 0 data in a printer which uses a print mechanism that develops a black pel with a Logic 1 bit from the bitmap) will not be stored in the printer's memory system at the serialization step, but instead only their locations on the physical printed page will be stored in the block list table.

Each entry in the block list table contains only the beginning address of the physical random access memory area that contains one of the image data blocks, but also contains other variables or attributes concerning the particular image data block, such as an expansion factor, whether this is the last block in the list for a "band" across the printed page, and whether or not this block is a regular non-null data block (i.e., a "real" data block), or a "no-op" (or "NOP") block containing null data. Of course, null data blocks require no physical memory address to be listed in their entry on the block list table, since no physical RAM areas are needed for storing null bitmap image data.

Rather than building a band in contiguous memory before shipping rasterized data to the laser printhead, the present invention builds a series of rasterized line segments of bitmap data in real time and sends them to the laser printhead "on the fly," by retrieving a single rasterized line segment of data, block-by-block, as needed to complete a single entire line required to define a "scan line" to be created on a photoconductive drum by a rotating polygonal mirror being struck by the laser's output beam. The preferred procedure for reading a single line from each block when needed is to access the block list table for a single band to be printed, place four (4) of the block list entries into a cache formed in the printer's ASIC, within which the individual block list entries are easily accessible by the Piecewise-Linear Direct Memory Access (PWLDMA) circuit from one block to the next within this cache.

If a single band contains twenty (20) separate blocks across the horizontal width of the band, then to read a single raster line of the band would require five (5) separate transfers of groups of four (4) block list entries in and out of the cache. While a particular block list entry resides in the cache, at the appropriate time the block address is inspected to direct a read operation from the corresponding area of RAM that is holding the bitmap "real data" for this particular block. By use of pointers, the appropriate rasterized line segment of bitmap data will be read from the corresponding memory locations in RAM, and transferred into a first in first out (FIFO) memory in the ASIC (which essentially comprises a multi-entry register). As the laser printhead requires data for this particular line segment, the FIFO memory will provide serialized data at the appropriate data transmission rate.

If the particular block of data is a null block, then when its corresponding block list entry is inspected while residing in the cache, its "NOP" attribute will indicate that the printer's image system should not look to the RAM to find the "real data" for this particular block's rasterized line segment, but instead should pull a line segment of null data from a special NOP register residing within the ASIC. This NOP register will feed a line segment of either all zeros or ones (depending upon whether regular image data or reverse image data is desired for the printed page) to the FIFO memory in the ASIC. It will be understood that the NOP register is a 32-bit general purpose register that will typically be filled with either all 1's or all 0's, however, it is not limited to this subset and its data set could contain other numeric values, including alternating 1's and 0's. Again at the appropriate time, this null data will be sent to the laser printhead at the appropriate data transmission rate from the bottom of the FIFO memory.

One attribute stored in the ASIC for a particular print job is the width of the block to be printed, which depends upon the resolution (in bits/pel) and the width (in bits) of the physical block to be printed. This block width attribute will determine when the Piecewise-Linear DMA circuit should move to the next entry in the block list cache in order to build a particular band on the printed page. In some cases, the "last block" of a band will not be required to be a "full" block, and only a "partial" block of data may be required to finish printing a particular line or band of the printed page. The present invention provides for both "full blocks" and "partial blocks", and also allows the size of the band to be unbounded by allowing as many blocks as is necessary to build the band, with no artificial constraints being placed on the number of blocks for that band. Instead, the "last block" attribute in the block list entry tells the system when the last block has been arrived at while outputting data for a particular band.

In the preferred embodiment described hereinbelow, the data transfers out of RAM to load line segments of single raster lines from individual blocks into the FIFO memory are implemented using a piecewise-linear addressing mode direct memory access (DMA) procedure. As opposed to conventional printers that build such data into a pre-established band buffer stored in memory, by first reading data out of a particular memory location in RAM and then by reading that same data back into another pre-established memory location in RAM reserved for the band buffer, the present invention merely reads the appropriate amount of data from a memory location holding the corresponding line segment data of a particular block from the RAM, and then directs that data into the FIFO memory. This saves memory bandwidth, thereby saving processing time for the processing system of the printer to perform other important tasks.

A fairly concise description of the procedure used in the present invention after the block list table (BLT) is built in RAM by the printer's software immediately follows, in which the BLT is "handed off" to the ASIC hardware through Block List Address registers BLA1 and BLA2, Band Transfer Count registers BTC1 and BTC2, and Block Width registers BW0 and BW1 in the ASIC.

1. The BLA1 register holds the addresses in RAM of the first Block List Table describing the first band of the bitmap.

2. The BLA2 register holds the addresses in RAM of the second Block List Table describing the second band of the bitmap.
3. The BTC1 register holds the number of 32 bit words to DMA transfer in band 1.
4. The BTC2 register holds the number of 32 bit words to DMA transfer in band 2.
5. The BW0 register defines the block width (in 32-bit words) of all blocks in the band except the rightmost block.
6. The BW1 register defines the block width (in 32-bit words) of the rightmost block in the band.

At this point, the contiguous raster line is built from the non-contiguous blocks by manipulating the hardware registers in the ASIC, as follows:

1. The BLA1 is the starting address of the BLT, and entries 1, 2, 3, and 4 are copied from the BLT (in RAM) into the Block List Cache (BLC) in the ASIC.
2. Starting with entry 1 of the BLC, the raster line segment is built in the raster FIFO in the ASIC.
   a. If NOP field is not set, the ADDRESS field of the BLT entry is used to copy the raster line segment from RAM into the raster line FIFO.
   b. If NOP field is set, the raster line segment is copied from the NOP register in the ASIC into the raster line FIFO.
   c. In both (2a) and (2b), the size of the data to copy is dependent upon the LB field (last block in band), and if the LB field is not set, the size of the raster line segment is defined by BW0; if the LB field is set, the size of the raster line segment is defined by BW1.
   d. After the copy operation of (2a) and (2b), the ADDRESS field is incremented in the BLC by the block width, and the LB field defines which BLC entry to process next. If the LB field is not set, the next sequential entry in the BLC is processed next; if the LB field is set, the raster line for the band is complete and the next entry is the first entry in the BLT addressed by the BLA1.
3. After entries 1, 2, 3, and 4 of the BLC are processed, the updated BLC must be written back to the BLT in RAM, and entries 5, 6, 7, and 8 from the BLT are copied into the BLC. Entries are moved in and out of the BLC for each time four entries are cached, until the last block LB is found.
4. Multiple raster lines are copied into the raster line FIFO until BTC1 expires, indicating the end of band 1, then:
   a. The Piecewise-Linear DMA automatically moves from the BLA1 and BTC1 registers (which describe band 1) to the BLA2 and BTC2 registers (which describe band 2), and seamlessly continues copying raster scan lines into the FIFO.
   b. An interrupt is posted to the microprocessor, and the software overwrites the BLA1 and BTC1 registers with the values that describe band 3.
5. The process continues until BTC2 expires indicating the end of band 2, then:
   a. The Piecewise-Linear DMA automatically moves from the BLA2 and BTC2 registers (which describe band 2) to the BLA1 and BTC1 registers (which describe band 1), and seamlessly continues copying raster scan lines into the FIFO.
   b. An interrupt is posted to the microprocessor, and the software overwrites the BLA2 and BTC2 registers with the values that describe band 4.
6. The process of parts (4) and (5) continues until the end of the page is reached.

Still other objects of the present invention will become apparent to those skilled in this art from the following description and drawings wherein there is described and shown a preferred embodiment of this invention in one of the best modes contemplated for carrying out the invention. As will be realized, the invention is capable of other different embodiments, and its several details are capable of modification in various, obvious aspects all without departing from the invention.

Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description and claims serve to explain the principles of the invention. In the drawings:

FIG. 5 is a diagrammatic view of a cache that holds four block list entries from the block list table of FIG. 4.

FIG. 6 is a diagrammatic view of the block list address registers that hold the address of two of the block list tables of FIG. 4.

FIG. 7 is a diagrammatic view of a first in first out (FIFO) memory that holds bitmap image data that is about to be transferred to the laser printhead of the printer of FIG. 1.

FIG. 8 is a diagrammatic view of two other registers used by the printer of FIG. 1, a no-op (NOP) register and a block width (BW) register.

DETAILED DESCRIPTION OF THE PREFERRED EMBODIMENT

Figure 1:
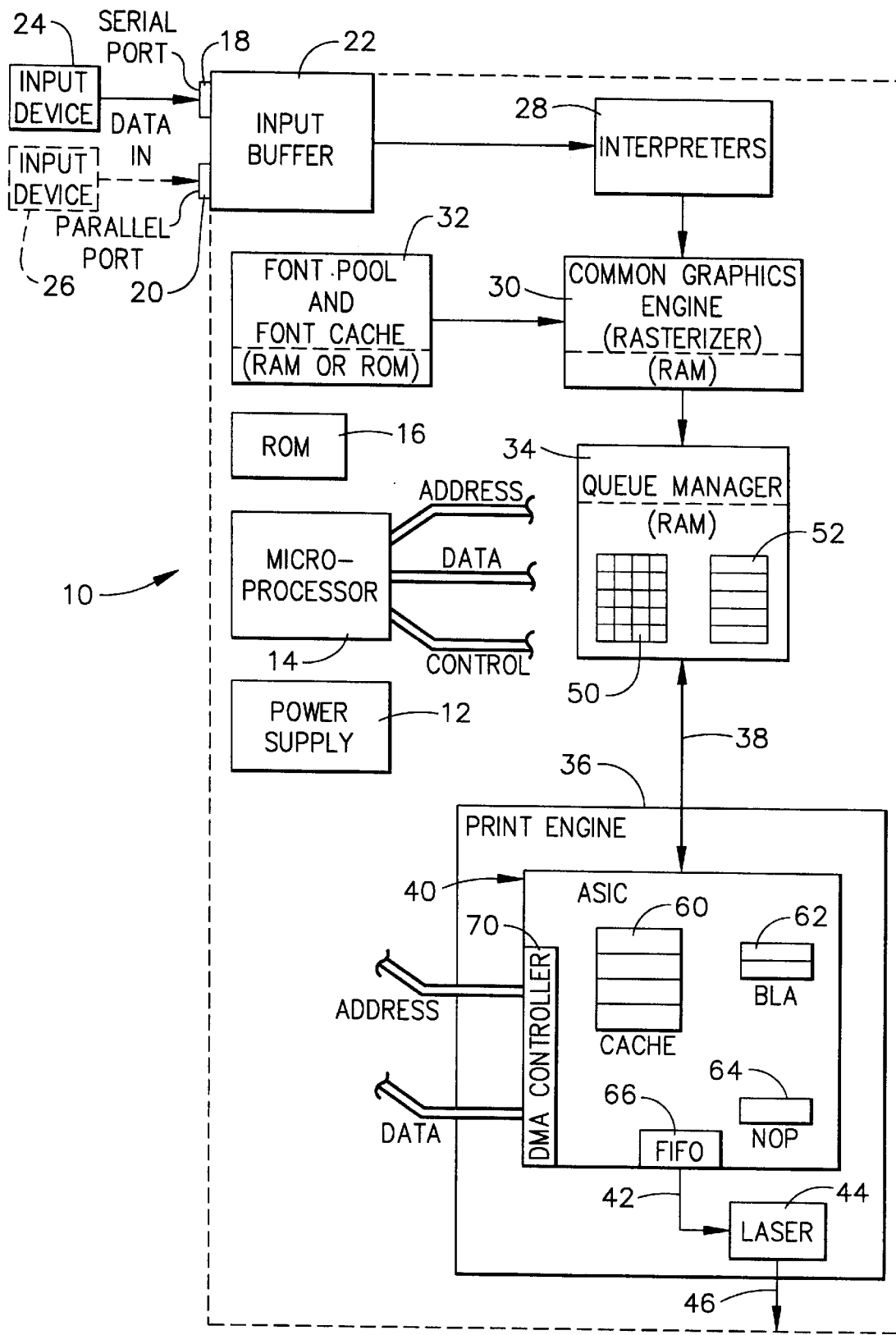
FIG. 1 is a hardware block diagram of the major components used in a laser printer, constructed according to the principles of the present invention.

Reference will now be made in detail to the present preferred embodiment of the invention, an example of which is illustrated in the accompanying drawings, wherein like numerals indicate the same elements throughout the views.

Referring now to the drawings, FIG. I shows a hardware block diagram of a laser printer generally designated by the reference numeral 10. Laser printer 10 will preferably contain certain relatively standard components, such as a DC power supply 12 which may have multiple outputs of different voltage levels, a microprocessor 14 having address lines, data lines, and control and/or interrupt lines, Read Only Memory (ROM) 16, and Random Access Memory (RAM), which is divided by software operations into several portions for performing several different functions.

Laser printer 10 also contains at least one serial input or parallel input port, or in many cases both types of input ports, as designated by the reference numeral 18 for the serial port and the reference numeral 20 for the parallel port.

Each of these ports 18 and 20 would be connected to a corresponding input buffer, generally designated by the reference numeral 22 on FIG. 1. Serial port 18 would typically be connected to a serial output port of a personal computer or a workstation that would contain a software program such as a word processor or a graphics package or computer aided drawing package. Similarly, parallel port 20 could be connected to a parallel output port of the same type of personal computer or workstation containing the same types of programs. Such input devices are designated, respectively, by the reference numerals 24 and 26 on FIG. 1.

Once the text or graphical data has been received by input buffer 22, it is commonly communicated to one or more interpreters designated by the reference numeral 28. A common interpreter is PostScript™, which is an industry standard used by most laser printers. After being interpreted, the input data is typically sent to a common graphics engine to be rasterized, which typically occurs in a portion of RAM designated by the reference numeral 30 on FIG. 1. To speed up the process of rasterization, a font pool and possibly also a font cache is stored, respectively, in ROM or RAM within most laser printers, and these font memories are designated by the reference numeral 32 on FIG. 1. Such font pools and caches supply bitmap patterns for common alphanumeric characters so that the common graphics engine 30 can easily translate each such character into a bitmap using a minimal elapsed time.

Once the data has been rasterized, it is directed into a queue manager or page buffer, which is a portion of RAM designated by the reference numeral 34. In a typical laser printer, an entire page of rasterized data is stored in the queue manager during the time interval that it takes to physically print the hard copy for that page, although the present invention treats this rasterized data in an entirely different manner than in previous printers. The data within the queue manager 34 is communicated in real time to a print engine designated by the reference numeral 36.

Print engine 36 includes a laser light source within the printhead, and its output 46 is the physical inking onto a piece of paper, which is the final print output from laser printer 10.

Print engine 36 contains an ASIC (Application Specific Integrated Circuit) 40, which acts as a controller and data manipulating device for the various hardware components within the print engine. The bitmap print data arriving from Queue Manager 34 is received by ASIC 40, and at the proper moments is sent to the laser printhead.

It will be understood that the address, data, and control lines are typically grouped in buses, which are electrically conductive pathways that are physically communicated in parallel (sometimes also multiplexed) around the various electronic components within laser printer 10. For example, the address and data buses are typically sent to all ROM and RAM integrated circuits, and the control lines or interrupt lines are typically directed to all input or output integrated circuits that act as buffers. Furthermore, a set of buses at reference numeral 38 not only sends bitmap image data from queue manager 34 to print engine 36, but also sends addressing commands from ASIC 40 to queue manager 34, as will be described in greater detail hereinbelow.

As noted hereinabove, queue manager 34 of the present invention is not required to hold an entire page of image data before printing can be started by print engine 36. As a bitmap image of a page to be printed is divided into rectangular "blocks" or "tiles," the actual bitmap data for each of these blocks or tiles is temporarily stored in a particular area of RAM, and these "areas" will also loosely be referred to herein as "blocks." As related above, the separate areas or blocks of RAM will likely be non-contiguous, even when storing bitmap data for a single band to be printed, and a representation of these non-contiguous memory blocks is generally depicted by the reference numeral 50. A "block" list table 52 is also stored in dynamic RAM, and this block list table represents a descriptor table in which the various fields in the table describe attributes of the various blocks. One of these fields is an "address field" which points to the area of physical dynamic RAM that stores one of the bitmap image blocks. This will be described in greater detail hereinbelow.

The ASIC 40 of print engine 36 contains several new components specifically used in connection with the present invention. A cache 60 is provided to hold several of the entries from the block list table 52. In addition, a pair of "Block List Address" registers 62 includes addressing information (i.e., pointers) for the physical memory address locations in dynamic RAM for two block list table 52. ASIC 40 also contains a special "no-op" register 64 that contains "null" data used when printing "empty" bitmap image blocks, or perhaps better described as when not "printing" such empty blocks, since typically no printed pels would be placed on paper for such empty areas on a physical sheet of paper. This no-op register 64 is also referred to herein as the "NOP" register.

ASIC 40 also contains a first in, first out (FIFO) memory 66 which stores rasterized bitmap data for final output along a data path 42 to the laser printhead 44. As rasterized line segment information is placed into the top of FIFO 66, its "bottom" portions are emptied at exactly the data transmission rate required to send serial digital data to the laser printhead so it can function in real time to produce the appropriate discharged areas on the photoconductive drum (not shown).

FIG. 1 also diagrammatically depicts the fact that the main system address and data busses not only are used by microprocessor 14 and the various RAM components of the printer 10, but are also directed into ASIC 40 of the print engine 36.

Figure 2:
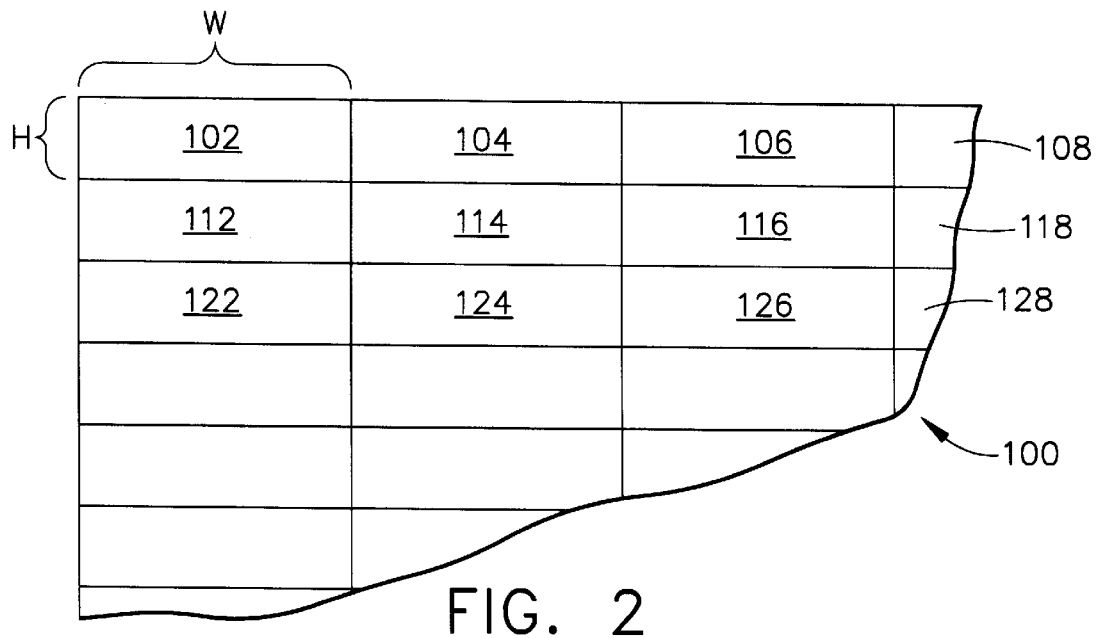
FIG. 2 is a portion of a bitmap representation of a page to be printed by the printer of FIG. 1, in which the bitmap has been divided into blocks or tiles.

FIG. 2 depicts a portion of a page to be printed by printer 10, in which its upper left-hand corner portion is generally depicted by the reference numeral 100. Various rectangular blocks, such as those indicated by reference numerals 102, 104, 106, 112, and 122 represent the so-called checkerboard pattern into which the bitmap image of the entire page is divided. The top row of blocks (i.e., blocks 102, 104, 106, and 108) are the left-most blocks that comprise the top band that will later be printed line-by-line by the laser printhead of print engine 36. Accordingly, blocks 112, 114, 116, and 118 make up the left-most blocks of the second band from the top of the page, and blocks 122, 124, 126, and 128 make up the left-most blocks of the third band from the top of the page.

In the preferred embodiment, each of these blocks contains 128 lines ×512 columns of pel or pixel data, at a bitmap resolution of one bit/pel, as represented by the dimensions "H" and "W" on FIG. 2, respectively. Using blocks of this size, the bitmap image data can be represented by an area in dynamic RAM of 8192 bytes (i.e., 8 K, with each byte containing 8 bits), and each 8 K area can be stored as a separate entity somewhere in the memory map of the printer's RAM. As related above, these memory areas will also be referred to herein as "blocks" and FIG. 3 depicts such a memory map 50 that contains ten (10) such blocks, numbered blocks B0–B9.

Each image block or tile, such as block 102, will generally contain one dot per pel. However, it will be understood that the image data could represent color data or Gray scale data, and for example, could require four (4) bits per pel, thereby requiring an area in memory of 32 KB. Assuming one bit per pel, at a print resolution of 1200 dpi (dots per inch), a standard 8 ½"×11"page can be divided into a matrix of twenty (20) horizontal blocks ×one hundred (100) vertical blocks, thereby requiring 2000 blocks per page. Each such block would require 8 KB of RAM area to contain the pel data, and so it can be seen that a single band of bitmap image data would require twenty (20) such blocks, or 160 KB of area in dynamic RAM of printer 10.

Figure 3:
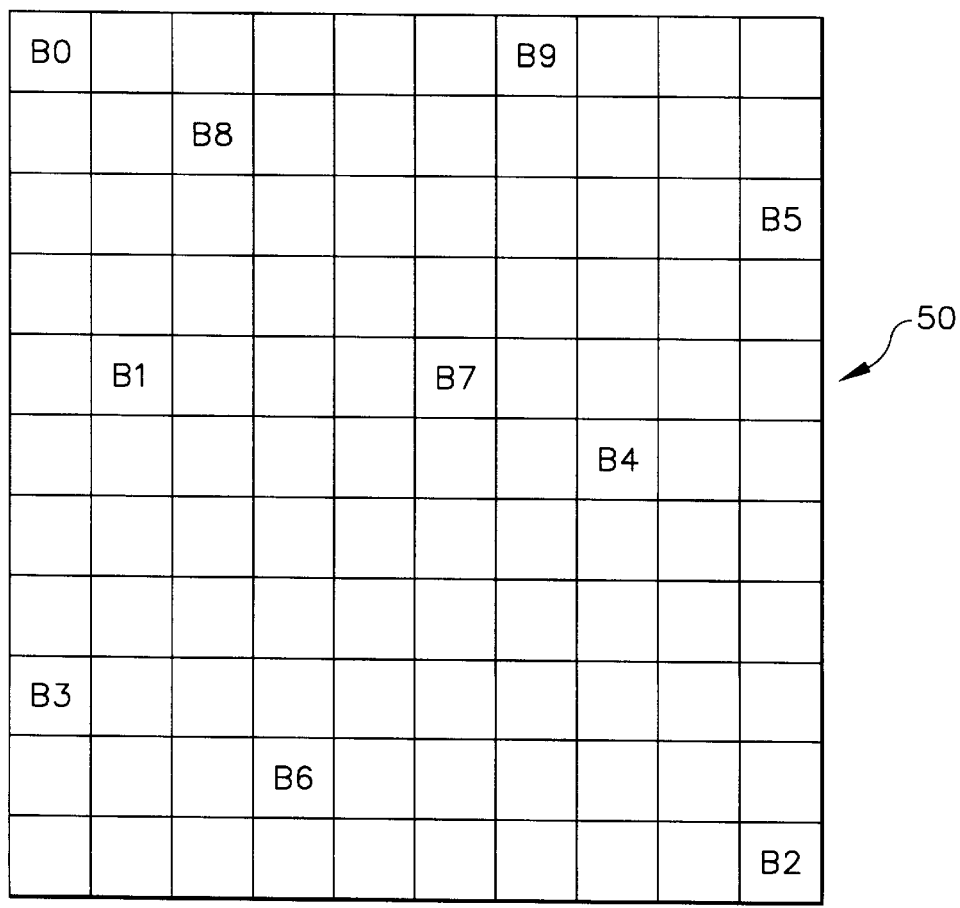
FIG. 3 is a diagrammatic view of a portion of the random access memory of the printer of FIG. 1, depicting various areas of memory locations that can contain a block of bitmap image data of a page to be printed.

Naturally, it is easier to allocate space in dynamic RAM for this large amount of data if that data can be broken into several smaller memory areas, which is depicted in FIG. 3 by a memory map 50. In FIG. 3, each square of the memory map represents an 8 KB area of RAM for printer 10, and the memory locations of adjacent squares would also have contiguous memory addresses in RAM. Since the blocks of image data can be broken down into 8 KB divisions, it is not necessary for all of the blocks of a particular band to be located next to one another in a contiguous set of memory addresses. For example, on FIG. 3, the first ten (10) blocks for a band are depicted by the descriptors B0–B9 and these are literally scattered all over the memory map 50. For example, block B0 could represent the area required to store the bitmap image data for block 102 on FIG. 2. Correspondingly, block B1 could represent the area for storing the bitmap image data of block 104, and block B2 could represent the memory area required to store the bitmap image data for block 106.

This type of divided memory allocation is quite common in some modern conventional printers, and these allocations in the memory map area typically are only temporary until it is time to build the band to be printed by the laser printhead. In conventional printers, blocks B0–B9 (as well as other blocks that would be needed to create an entire band of 20 blocks) would need to be retrieved from the dynamic RAM from their locations depicted on memory map 50, and then moved to new physical memory addresses (not shown) so as to build the band, and these new physical memory addresses would typically be in a dedicated set of memory addresses reserved for the band buffer. In the present invention, this retrieval of these blocks of bitmap information and then re-locating this image data to new memory addresses is not necessary, as will be seen hereinbelow.

Figure 4:
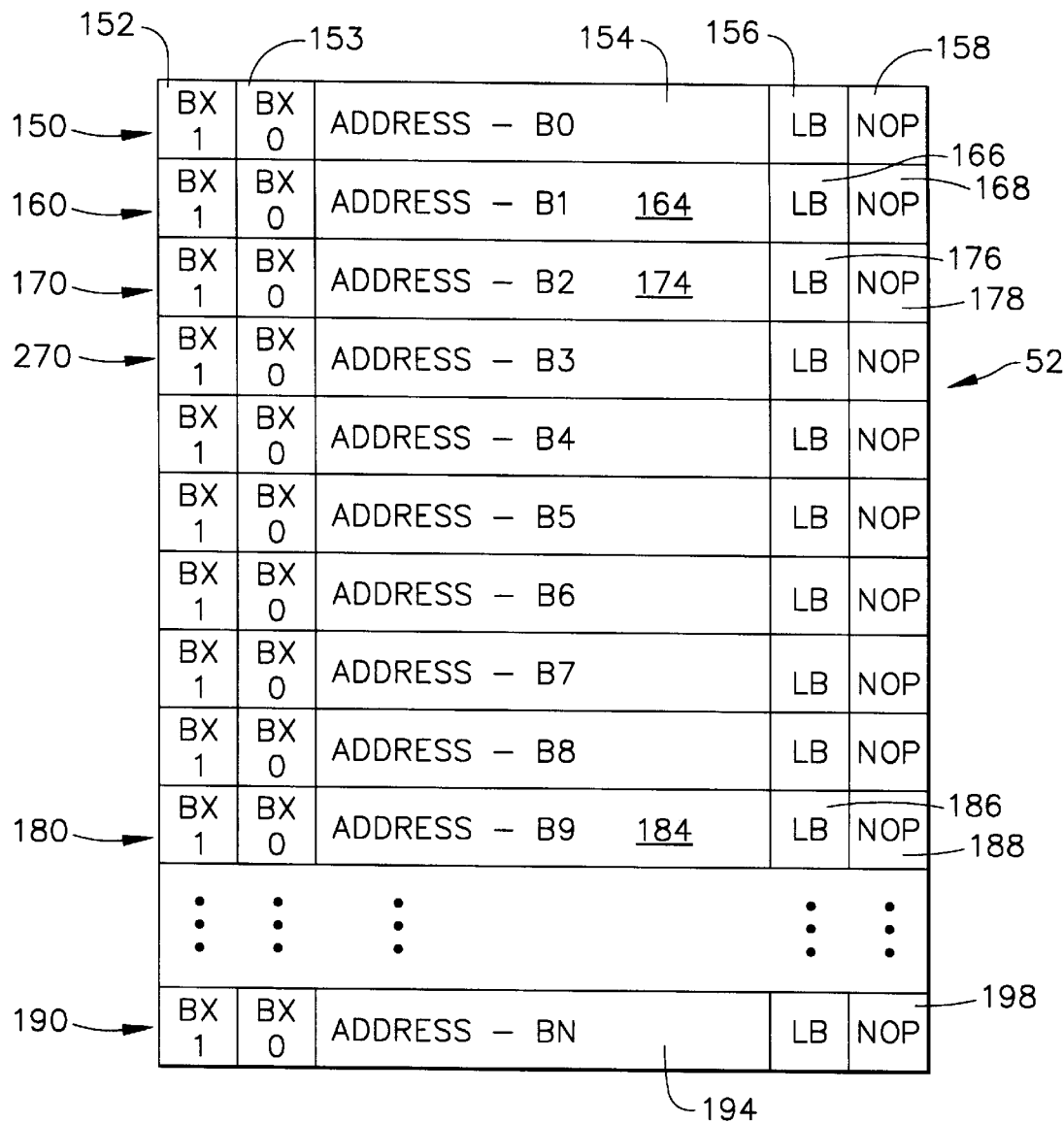
FIG. 4 is a diagrammatic view of a portion of the block list table used by the present invention to store location information and other attributes of blocks of image data that make up the printed page of FIG. 2.

FIG. 4 depicts a block list table generally designated by the reference numeral 52. As related above, this block list table 52 is a descriptor table which contains various fields of information at each entry in the table. For example, the first entry, designated by the reference numeral 150, includes various fields of information, such as two bits representing a "block expansion factor", i.e., a bit "BX1" at 152, and a bit "BX0" at 153. In the preferred embodiment, if both bits BX1 and BX0 are set to zero (0), then the expansion factor ratio is equal to 1:1, which is a replication of the original bitmap image data. If the BXn bits are equal to the value "01," then the expansion factor ratio is 1:2, and two black pels are shipped out for every single Logic 1 data bit. Similarly, expansion factors of 1:4 and 1:8 are also available in the preferred embodiment, in which either four (4) or eight (8) black pels are shipped out for every Logic 1 bitmap value.

The reference numeral 154 represents the "address field" for the first entry 150 of the block list table 52. In FIG. 4, address field 154 represents the area of memory map 50 in which image bitmap data for the block B0 resides. In the preferred embodiment, there is space in the address field for a 27-bit memory address, which would represent a pointer to the beginning address of the contiguous memory for a particular area of the printer's dynamic RAM containing this block of image data.

Other fields in the block list table for the first entry 150 include an "LB" bit 156, and a "NOP" bit 158. In the preferred embodiment, if LB =0, this block list entry 150 does not represent the last block in the list for this particular band of bitmap image data. If LB =1 then this block list entry represents the last block in the list for this particular band, and consequently this block could be a "partial" block. When printing the front side of a page, the last block in the band could be a partial block. This would be used in case the number of pels to be printed for a particular band is not precisely an exact multiple of the "Block Width," which is another parameter that is stored in the ASIC 40. On the other hand, if the reverse side of a duplex print job is being printed, the first block in the band can be a partial block. This will be discussed in greater detail below.

If the bit NOP =1, then the physical image data block for this block list entry was a null block (containing empty or zero data), and the system will call for a "no-op" transfer of data, which will be derived from a register within ASIC 40 rather than from a group of memory elements in the dynamic RAM of the printer's memory system. On the other hand, if NOP =0, this specifies a regular transfer in which "real data" will be retrieved from the printer's dynamic RAM using, for example, the pointer specified in the address field 154 for block B0.

In a similar manner, the block list entry 160 includes an address pointer 164 for block B1, and has "Last Block" and "No-op" parameters specified at reference numerals 166 and 168, respectively. The third entry in the block list table at 170 similarly includes an address field 174 for block B2, and corresponding Last Block and No-op bits at 176 and 178, respectively.

If (as in the preferred embodiment) the number of blocks for a band is equal to twenty (20), the bitmap image data may contain less than twenty bitmap image blocks containing any pel data that actually needs to be printed. In other words, some of the blocks within that band could be "empty" or zero data, in which no pels would be printed on the physical page at those actual block locations. The first band at the top of FIG. 2 could contain twenty (20) total blocks of bitmap image data; however, only ten (10) of these blocks, for example, contain any "real" data that will actually be printed, and these are represented by the blocks designated B0–B9 on FIGS. 3 and 4. If, blocks B0–B9 represented the first ten (10) left-most physical blocks on the page to be printed, and then the next ten (10) blocks on this top band contained only empty or zero data, then FIG. 4 would contain a block list table in which the NOP bit is set to Logic 0 for all of the first ten (10) block list entries (i.e., those entries for blocks B0–B9). The next ten (10) block list entries would then contain a NOP value equal to Logic 1.

In this example, the tenth block list entry at reference numeral 180 would contain a NOP equal to Logic 0 at numeral 188. If the entry 190 were one of the next ten (10) on this block list table, then the NOP at 198 would be set equal to Logic 1. Under these conditions, the address field 194 for block "BN" could be disregarded, or set to zero, since there is no physical area in dynamic RAM of printer 10 that contains the null data for this block. According to the present invention, null data blocks are not stored in memory, which saves a great deal of memory space when temporarily storing bitmap image data for a page to be printed. Later when it is time to print the band containing block BN, the appropriate null data will be sent to the print engine from a NOP register 64, as depicted on FIG. 8. This will be described in greater detail hereinbelow.

The block list table 52 on FIG. 4 is conducive to piecewise-linear addressing, using a DMA (direct memory access) channel using a DMA controller 70 residing within ASIC 40. Each of the block list entries (such as entry 150) preferably are of a 32-bit width, or four bytes in size. When storing this information in the printer's dynamic RAM, it is preferred that contiguous physical memory locations be used to store these block list entries so that each block list entry can be accessed oneafter the other by merely shifting the address pointer by four bytes.

A "Block List Address" parameter register, generally designated by the reference numeral 62 on FIG. 6, provides the address of the start of the block list table. For example, the block list address for block B0 is located at reference numeral 250, and to address the next entry in the block list table as the DMA traverses blocks, the value {block number * 4} is added to the block list address registers without updating the registers with the incremented value. This results in the identical list addressing for each pass through the list. The block list address registers are double buffered, and the block list table is also double buffered in data memory to support the DMA channels "autoreload" mode. This autoreload mode is clearly described hereinabove, and allows the various bands to be continually moved in and out of a first Block List Table 250 (i.e., BLA1) and a second Block List Table 252 (i.e., BLA2) while seamlessly continuing to copy raster line data into the FIFO 66.

A cache designated by the reference numeral 60 on FIG. 5 is created in memory elements of ASIC 40. Cache 60 can hold, in the preferred embodiment, four (4) block list entries at a given moment. For example, in Cache #1, at reference numeral 200, the block list entry 150 could be placed. If that were to occur, then Cache #2 at 210 would contain the block list entry 160, Cache #3 at 220 would contain the block list entry 170, and Cache #4 at 230 would contain the block list entry for block B3. In this example, the address field 204 now located in Cache #1 would be the same as the address field 154. The bit expansion factors 202 and 203 would be the same as those bits 152 and 153, while the LB bit 206 would be the same as LB bit 156, and the NOP bit 208 would have the same value as the NOP bit 158. The address field in Cache #2–#4 are depicted by the reference numerals 214, 224, and 234, respectively. In this example, all four (4) block list entries currently residing in cache 60 contains "real data" and so the address fields 204, 214, 224, and 234 will point to actual physical memory locations in the dynamic RAM of printer 10.

The Block List Address (BLA) registers 62 are preferably used to contain two (2) pointers to memory locations in the printer's dynamic RAM that hold the block list tables for data currently being processed. In this example, the BLA1 pointer at 250 will point to the memory element containing the first byte of a first block list table 54, and the BLA2 pointer 252 will point to first byte of a second block list table (not shown).

One of the important aspects of the present invention is its ability to quickly access the data required to build a single raster line of a band in real time and present this raster line to the print engine "on the fly" as paper is moving through the printer. This is accomplished by accessing the first four (4) block list entries by referring to the BLA register 62, and for this particular band this would be blocks B0–B3. As these four (4) block list entries are accessed from block list table 52, they are quickly placed into the cache 60 at the cache locations Cache #1–Cache #4. All four blocks relating to the entries 150, 160, 170, and 270 are quickly cycled through the two BLA registers, as described hereinabove.

After referring to a "Block Width" parameter defined in registers "BW1" and "BW0" at reference numeral 68 on FIG. 8 (which are registers residing in the ASIC 40), the actual bitmap image data can be retrieved from the printer's dynamic RAM, block-by-block. Preferably, this is under the control of DMA controller 70 that transfers the bitmap image data from dynamic RAM into a first in, first out (FIFO) memory 66 on FIG. 7, which is also part of the ASIC 40.

Once the four block list entries are placed into cache 60, then the DMA controller 70 inspects the address field (i.e., field 204 in Cache #1 at 200) to find the beginning memory element that contains the bitmap data for block B0. After reading the number of data bits specified by the Block Width parameters BW1 and BW0, the appropriate amount of bitmap data is transferred into the first register at reference numeral 260 of the FIFO 66. It will be understood that the image data for the entire block B0, which contains a matrix of rows and columns of bits of information (typically 128×512 bits, as defined by BW0 and BW1), is not being transferred into register 260 of FIFO 66; rather, only a single raster line from block B0 is being transferred into the FIFO. Therefore, Register #1 at numeral 260 contains only 512 bits of image data, which will eventually be transferred to the printhead of print engine 36 as a single raster line of serial information (which of course, is the desired result for a laser printer).

Next, DMA controller 70 will look to the address pointer of the address field 214 in Cache #2 at 210, which will point to the memory element location containing the "real data" for block B1. The DMA controller will now access the appropriate portions of this image data in the printer's dynamic RAM to extract only a single raster line of data from that block B1, and that single line segment is now placed into the FIFO 66. As that occurs, this raster line segment from block B1 will be placed at the top of FIFO 66, at register 260. Simultaneously, the previous contents of register 260 will be shifted down into the next lower register 262, depicted as Register #2 in the FIFO.

These types of operations continue for the next two blocks of data (i.e., for blocks B2 and B3) which will have their block list entries placed into locations 220 and 230 of cache 60, and DMA controller 70 will correspondingly find the appropriate raster line segment of data that is being pointed to in the printer's dynamic RAM to bring in two more sets of 512-bit image data to be loaded into the top of FIFO 66 at register 260. Once the entire FIFIO 66 is filled with the four (4) sets of raster line segments, all four registers 260, 262, 264, and 266 of FIFO 66 will be filled with bitmap image data for four contiguous raster line segments that make up one-fifth of a band's raster line for the page to be printed. At this time, the raster line segment for block B0 is resident at register 266, and is available to be transferred along data path 42 to the laser printhead 44 at the appropriate data transmission rate for which that laser printhead desires to receive data. As this group of 512 bits is transferred to the laser printhead, the data for the line segment of block B1 (temporarily residing in register 264) will then transfer down to the bottom register 266, and it too will become available to be transferred to the laser printhead 44.

Another advantage of the present invention is the savings in memory bandwidth by using the cache 60 to hold the information for four (4) block list entries at a time. When DMA controller 70 loads the cache 60 by transferring block list entries 150, 160, 170, and 270 into the cache locations 200, 210, 220, and 230, it requires four clock cycles to bring in the first block list entry. Once the cache 60 is loaded with these block list entries, the printer can quickly increment through the cache to inspect the other block list entries. Since each such increment will require one clock cycle, it will require only seven (7) clock cycles to inspect all four block list entries within cache 60. Alternatively, if each block list entry was singularly referenced, a total of sixteen (16) clock cycles would be required. By this quick turn-around time of accessing through cache 60, the printer can very quickly bring in the appropriate raster line segment data for the four blocks presently about to be printed at the laser printhead 44.

In the circumstance where one or more of the blocks being printed is a null data block, then the block list entry will be loaded into the cache 60, as if it were any other block list entry containing real data. However, when reading its NOP attribute, the system will realize that the DMA controller 70 need not go off and access any physical memory elements in the printer's dynamic RAM. Instead, the NOP register 64 (within ASIC 40) will be accessed to provide the appropriate 512-bit stream of raster line segment data. If in a "normal" print mode, then the NOP register 64 will provide 512 consecutive bits (i.e., assuming this is a "full block" defined by the BW0 register) having a Logic 0 value. If printing in a "reverse" video mode, then NOP register 64 will provide 512 consecutive data bits having a Logic 1 value. This feature of the present invention not only saves physical RAM space by not storing null data blocks in the first place, but also unloads the memory and data busses of laser printer 10 and thereby increases its performance by not draining its memory bandwidth capacity.

The Last Block (LB) attribute of the block list entry is used by cache 60 to inform the DMA controller 70 that it will soon be time to go to the next raster line of the block, or to go to an entire new block (for its first raster line) by bringing in four consecutive block entries for the appropriate image data block. When this occurs, the next block list entry to be accessed will cycle back to the first entry of the list, and this sequencing continues until the "transfer count" expires, which means the end of the band has been reached. When the transfer count expires in autoreload mode, the block list address and the transfer account are transferred from a "holding register" to the "active register" and the DMA channel is rearmed to continue processing DMA requests. When a terminal count is reached and the DMA channel is not in autoreload mode, an interrupt will trigger an interrupt service routine to rearm the channel.

As related above, the last block in a band can be a "partial" block, which is required for bands having a data width that is not an exact multiple of the Block Width. The "BW0" parameter register is used for the block width for the first block through the next to last block in a band for pages being printed on their front side. For the last block in the band, the "BW1" parameter register is used for its block width.

Of course, BW1 could have a value equal to BW0 for bands that are an exact multiple of a block width. To print the reverse side in a duplex printing operation, the "BW1" parameter register is used for the block width for the first block in the band. For the second through the last block in this band, the "BW0" parameter register is used for the block width.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

We claim:

1. A printing apparatus, comprising:

(a) a memory circuit, said memory circuit containing a main area of memory elements, and containing a cache area of memory elements;

(b) a print engine that inputs bitmap print data and renders an output in the form of a print media; and (c) a processing circuit that is configured to control the flow of data between said memory circuit and said print engine and to provide bitmap print data to said print engine, said processing circuit also being configured to operate upon print job data residing within said memory circuit to create a plurality of bands of bitmap print data per each page to be printed by said print engine, each of said plurality of bands comprising a plurality of blocks of bitmap print data and each of said plurality of blocks having a corresponding entry in a block list table; wherein:

all blocks containing non-null data are temporarily stored in an image table of said main area of memory elements of the memory circuit, and all blocks containing null data are not stored in said image table;

a portion of the plurality of entries of said block list table is temporarily stored within said cache and operated upon while residing in said cache; and as each of said plurality of bands are made available to said print engine for printing, under the control of the entries in said cache, all blocks within the present band containing null data are filled from an internal register as their respective data is communicated to said print engine in real time without the use of a band buffer, and all blocks within the present band containing non-null data are filled from said image table as their respective data is communicated to said print engine in real time without the use of a band buffer.

2. The printing apparatus as recited in claim 1, wherein the use of said cache and a block list table allows the width of the band to be unbounded.

3. The printing apparatus as recited in claim 1, wherein the blocks of non-null data are stored in the image table at non-contiguous physical memory locations.

4. The printing apparatus as recited in claim 1, wherein said block list table stores a pointer of a memory address in said image table for all blocks of each band.

5. The printing apparatus as recited in claim 1, further comprising at least one block list address register which contains a pointer to memory elements representing at least one of said plurality of block list tables.

6. The printing apparatus as recited in claim 1, wherein said internal register contains data for a null block.

7. The printing apparatus as recited in claim 1, wherein said image table comprises random access memory and said internal register comprises memory elements of an application specific integrated circuit (ASIC) contained in said print engine.

8. A printing apparatus, comprising:
(a) a memory circuit, said memory circuit containing a main area of memory elements, and containing a cache area of memory elements;
(b) a print engine that inputs bitmap print data and renders an output in the form of a print media; and
(c) a processing circuit that is configured to control the flow of data between said memory circuit and said print engine and to provide bitmap print data to said print engine, said processing circuit also being configured to divide rasterized bitmap print job data of each page to be printed by said print engine into a plurality of blocks of bitmap print data, each of said plurality of blocks having a corresponding entry in a block list table; wherein:
  all blocks containing non-null data are temporarily stored in an image table of said main area of memory elements of the memory circuit, and all blocks containing null data are not stored in said image table;
  a portion of the plurality of entries of said block list table is temporarily stored within said cache;
  bitmap image data corresponding to the blocks of the block list table stored in said cache is retrieved from said image table for blocks containing non-null data, and is retrieved from a NOP register for blocks containing null data; and
  bitmap image data is communicated in real time to said print engine for printing on a block-by-block basis for said blocks of the block list table stored in said cache.

9. The printing apparatus as recited in claim 8, wherein the blocks of non-null data are stored in the image table at non-contiguous physical memory locations.

10. The printing apparatus as recited in claim 8, wherein said block list table stores a pointer of a memory address in said image table for all blocks.

11. The printing apparatus as recited in claim 8, further comprising at least one block list address register which contains a pointer to memory elements representing at least one of said plurality of block list tables.

12. The printing apparatus as recited in claim 8, wherein said NOP register contains data for a null block.

13. The printing apparatus as recited in claim 8, wherein said image table comprises random access memory and said NOP register comprises memory elements of an application specific integrated circuit (ASIC) contained in said print engine.

14. The printing apparatus as recited in claim 8, wherein a single rasterized line of bitmap image data for each of the blocks of the block list table currently stored in said cache is retrieved from one of said image table and said NOP register, then communicated to a FIFO memory which has a sufficient capacity to hold bitmap image data corresponding to said single rasterized line of at least one of the blocks of the block list table currently stored in said cache, and at the appropriate times said FIFO transmits the bitmap image data to said print engine in real time.

15. In a printing system having a memory storage device, a print engine, and a processing circuit, a method of efficiently storing bitmap print data and combining null and non-null bitmap print data without buffering for printing in real time, said method comprising the steps of:
(a) dividing rasterized bitmap print job data of each page to be printed by said print engine into a plurality of blocks of bitmap print data, each of said plurality of blocks having a corresponding entry in a block list table;
(b) temporarily storing all blocks containing non-null in an image table of a main area of memory elements of the memory storage device, and temporarily storing information about each of said non-null data blocks in an entry in a block list table;
(c) temporarily storing information about each of said null data blocks in a entry in said block list table;
(d) temporarily storing a portion of the plurality of entries of said block list table within a cache;
(e) retrieving bitmap image data corresponding to the blocks of the block list table stored in said cache from said image table for blocks containing non-null data, and from a NOP register for blocks containing null data; and
(f) communicating bitmap image data in real time to said print engine for printing on a block-by-block basis for said blocks of the block list table stored in said cache.

16. The method as recited in claim 15, further comprising the steps of:
(g) retrieving a single rasterized line of bitmap image data for each of the blocks of the block list table currently stored in said cache from one of said image table and said NOP register;
(h) communicating to a FIFO memory said single rasterized line of all of the blocks of the block list table currently stored in said cache; and
(i) transmitting at appropriate times the bitmap image data from said FIFO to said print engine in real time.

17. The method as recited in claim 15, wherein the blocks of non-null data are stored in the image table at non-contiguous physical memory locations.

18. The method as recited in claim 15, further comprising the step of storing in said block list table a pointer of a memory address in said image table for all blocks.

19. The method as recited in claim 15, further comprising providing at least one block list address register which contains a pointer to memory elements representing at least one of said plurality of block list tables.

20. The printing apparatus as recited in claim 15, wherein said NOP register contains data for a null block.

21. The printing apparatus as recited in claim 15, wherein said image table comprises random access memory and said NOP register comprises memory elements of an application specific integrated circuit (ASIC) contained in said print engine.

* * * * *